United States Patent [19]

Ishikawa et al.

[11] Patent Number: 5,854,702
[45] Date of Patent: Dec. 29, 1998

[54] OPTICAL TELECOMMUNICATION MODULE

[75] Inventors: Tomohisa Ishikawa; Katsuhiko Hakomori, both of Kawasaki; Tatsuya Nishimura, Sapporo, all of Japan

[73] Assignee: Fujitsu Limited, Kawasaki, Japan

[21] Appl. No.: 694,343

[22] Filed: Aug. 8, 1996

[30] Foreign Application Priority Data

Aug. 10, 1995 [JP] Japan ..................................... 7-204252

[51] Int. Cl.⁶ ................................................ H04B 10/00
[52] U.S. Cl. ...................... 359/152; 359/153; 359/157; 359/187
[58] Field of Search .................... 359/192–153, 359/157, 163, 187, 194

[56] References Cited

U.S. PATENT DOCUMENTS 5,528,407  6/1996  Nakata et al. .......................... 359/152
5,546,212  8/1996  Kunikane et al. ...................... 359/163

FOREIGN PATENT DOCUMENTS 7-191241  7/1995  Japan .

Primary Examiner—Kinfe-Michael Negash
Attorney, Agent, or Firm—Nikaido, Marmelstein, Murray & Oram LLP

[57] ABSTRACT

An optical module includes a photodiode disposed in front of a laser diode with an offset from an optical axis of the laser diode, for monitoring the power of an optical beam emitted from the laser diode in a forward direction. The optical module further achieves switching between a transmission mode and a reception mode in response to a drive current supplied to the laser diode.

5 Claims, 6 Drawing Sheets

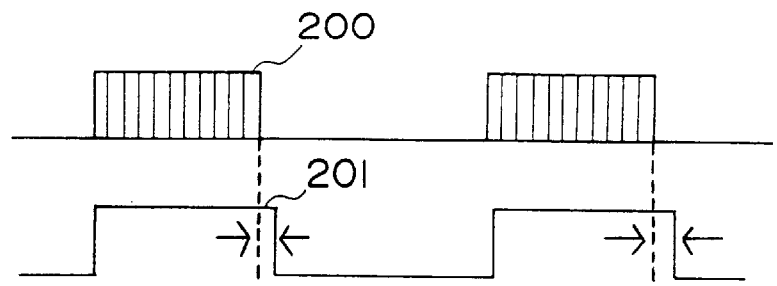
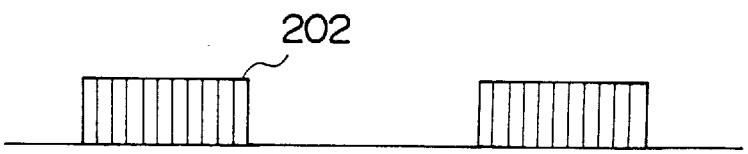
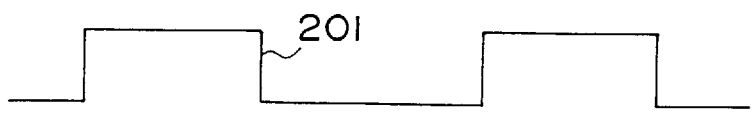

OPTICAL TELECOMMUNICATION MODULE

BACKGROUND OF THE INVENTION

The present invention generally relates to optical telecommunications and more particularly to an optical telecommunication module used in a TCM (Time Compression Multiplex) system that realizes a duplex optical telecommunication on a single optical fiber cable by applying the art of time-divisional multiplexing.

FIGS. 1A and 1B show the principle of a TCM telecommunication system, wherein FIG. 1A shows a passive double star (PDS) arrangement that is one of various topologies used for optical subscriber lines.

Referring to FIG. 1A, a station X designated by a reference numeral 100 is connected to a plurality of subscribers A–D respectively designated as 102–105 via a star coupler 101, wherein the station X is connected to the star coupler 101 by a single optical fiber cable 110. The station thereby realizes a duplex telecommunication on the single optical fiber cable 110 by switching the transmission mode and reception mode according to a time-divisional multiplexing. Such a telecommunication system is called TCM-TDMA system.

When setting up the system, the station X first transmits an optical pulse to each of the subscribes A–D and measures the transmission delay to each of the subscribes A–D, by detecting returned optical pulses. Based upon the transmission delay thus measured, a transmission time slot is set for each of the subscribers A–D such that a subscriber can transmit information to the station X upon reception of transmission from the station X, without causing interference with other subscribers, as long as the transmission is made in the allocated time slot. Thereby, the transmission of information from the station X to the subscribers A–D, from the subscriber A to the station X, and from the subscriber B to the station X, are made via the time slots of respective subscribers as indicated in FIG. 1B.

FIG. 2 shows a conventional optical telecommunication module 10 that constitutes a part of the conventional TCM optical telecommunication system.

Referring to FIG. 2, the optical telecommunication module 10 includes an optical transceiver 11 for sending out an optical transmission signal on an optical transmission line 13 provided by an optical fiber cable according to a transmission signal and for receiving an optical transmission signal incoming thereto from the optical transmission line 13, and a drive unit 12 for driving the optical transceiver 11 by the transmission signal. Further, the drive unit 12 reproduces a reception signal from the optical transmission signal received by the optical transceiver 11. The optical transceiver 11 and the drive unit 12 are mounted upon a printed circuit board.

The optical transceiver 11 includes an optical coupler 14 connected to the optical transmission line 13 and an optical transmission module 15 connected to the optical coupler 14 via an optical fiber 22 as well as an optical reception module 16 connected to the optical coupler 14 via an optical fiber 24, wherein the optical transmission module 15 includes a laser diode 18 driven by a drive circuit 30 that forms a part of the drive unit 12. As indicated in FIG. 3, the laser diode 18 is held on a base member 17 forming a part of the optical module 15 and is coupled optically to the optical fiber 22 via a lens 20, which is held on an enclosure 21 that covers the optical transmission module 15. It should be noted that the drive circuit 30 is supplied with transmission data together with a clock signal and produces an analog drive signal that drives the laser diode 18 in response thereto.

In order to monitor the optical signal emitted from the laser diode 18, the optical transmission module 15 further includes a photodiode 19 on the base member 17 commonly to the laser diode 18 as indicated in FIG. 3, such that the photodiode 19 detects the optical beam emitted backward from the photodiode 19. The photodiode 19 is biased by an APC (Automatic Power Control) circuit 31 included in the drive unit 12, and the APC circuit 31 controls the optical power of the laser diode 18 by referring to a threshold level supplied from a threshold circuit 32.

The reception module 16 has a similar construction as indicated in FIG. 3 in that a photodiode 23 is held on a base member corresponding to the base member 15 in place of the laser diode such that the photodiode 23 is coupled optically to the optical fiber 24 via a lens held on an enclosure, similarly to the lens 20 held on the enclosure 21 as shown in FIG. 3. Of course, there is no such a photodiode corresponding to the photodiode 19 in the reception module 16. Thus, illustration of the reception module 16 will be omitted. The photodiode 23 produces an electrical output in response to an optical signal supplied thereto via the optical fiber 24 and feeds the same to an AGC (Automatic Gain Control) circuit 34 included in the drive unit 12 via a transmission/reception switch 36.

It will be noted that the transmission/reception switch 36 is supplied with a transmission/reception (TX/RX) control signal and activates the APC circuit 31 and the threshold circuit 32 when the TX/RX control signal indicates the transmission mode of the optical telecommunication module 10, while the switch 36 deactivates the circuits 31 and 32 when the TX/RX control signal indicates the reception mode of the optical telecommunication module 10. Thereby, a time-divisional switching of the transmission mode and reception mode is achieved for the telecommunication module 10 in response to the TX/RX control signal.

In the reception mode, the switch 36 forwards the output signal of the preamplifier 33 to the AGC circuit 34 for automatic gain control, and the output signal is further forwarded to a TIM/DEC (Timing recovery/Decision) processor 35 for timing extraction, wherein the processor recovers the clock and data based upon the timing thus recovered.

In the conventional construction shown in FIGS. 2 and 3, it will be noted that the photodiode 19 monitors the optical output of the laser diode 18 by detecting the optical beam emitted backward from the laser diode 18. As long as the time-dependent change of optical output occurs similarly in the forward direction and in the backward direction, no substantial problem occurs in the foregoing conventional construction. On the other hand, there are cases in which the change of optical beam output occurs asymmetrically in the forward direction and in the backward direction. For example, the optical output in the forward direction may decrease rapidly as compared with the optical output emitted in the backward direction. In such a case, the optical power of the optical beam emitted in the forward direction is decreased even when an APC control is applied by using the APC circuit 31, and the optical power of beam injected into the optical fiber 22 is reduced. In such a case, the node that uses the optical telecommunication module 10 is rendered defective. Such an anomaly of the laser diode 18 cannot be detected by the photodiode 19, as long as the emission of the optical beam in the backward direction occurs normally.

Further, the optical telecommunication module 10 has a problem of increased number of signal lines due to the construction of supplying the TX/RX control signal externally from a host TCM apparatus not illustrated in FIG. 2.

SUMMARY OF THE INVENTION

Accordingly, it is a general object to provide a novel and useful optical telecommunication module wherein the foregoing problems are eliminated.

Another and more specific object of the present invention is to provide an optical telecommunication module in which optical output power of an optical beam injected into an outgoing optical fiber is directly monitored.

Another object of the present invention is to provide an optical telecommunication module having a simplified construction.

Another object of the present invention is to provide an optical telecommunication module, comprising:

an optical transceiver adapted for coupling to an optical transmission line for sending out an outgoing optical transmission signal therealong and for receiving an incoming optical transmission signal therefrom;

said optical transceiver including a light emitting device supplied with a transmission signal for emitting an optical signal in response thereto, an optical coupler adapted for coupling to the optical transmission line, the optical coupler being connected optically to the light emitting device for injecting the optical signal emitted from the light emitting device into the optical transmission line as the outgoing optical transmission signal, and a photodetection device connected optically to the optical coupler for receiving the incoming optical transmission signal from the optical transmission line, the photodetector producing a reception signal in response thereto;

a drive unit for driving the optical transceiver, said drive unit including a drive circuit feeding the transmission signal to the light emitting device, an automatic power control circuit for controlling a drive current of the light emitting device such that the optical signal emitted from the light emitting device has a predetermined, constant optical power, an automatic gain control circuit for controlling a level of the reception signal at a predetermined level, and a transmission/reception switching circuit for selectively activating the automatic power control circuit and the automatic gain control circuit, such that the automatic power control circuit is activated in a transmission mode for transmitting the outgoing optical signal and that the automatic gain control circuit is activated in a reception mode for receiving the incoming optical signal;

said optical telecommunication module further including a monitoring photodetection device such that the monitoring photodetection device detects a part of the optical signal emitted from the light emitting device for injection into the optical transmission line.

Another object of the present invention is to provide an optical module, comprising:

a base;

a light emitting device mounted upon said base for emitting an output optical beam in a forward direction along a predetermined optical axis;

a photodetection device mounted upon said base at said forward direction of said light emitting device, said photodetection device being mounted with an offset from said predetermined optical axis;

wherein said photodetection device is inclined toward said light emitting device for detecting a part of said optical beam emitted from said light emitting device.

According to the present invention, the output power of the optical signal injected to the optical transmission line is monitored directly by the monitoring photodetection device. Thereby, the problem of erroneous optical power detection as in the conventional case in which the output optical power is monitored based upon the optical beam emitted in the backward direction from the light emitting device, is successfully eliminated.

Other object and further features of the present invention will become apparent from the following detailed description when read in conjunction with the attached drawings.

BRIEF DESCRIPTION OF THE DRAWINGS

FIGS. 7A and 7B are diagrams showing a switching of transmission mode and reception mode in the optical telecommunication module of the present invention; and FIG. 8A–8C are other diagrams showing a switching of transmission mode and reception mode in the optical telecommunication module of the present invention.

DETAILED DESCRIPTION OF THE PREFERRED EMBODIMENTS

Figure 1A:
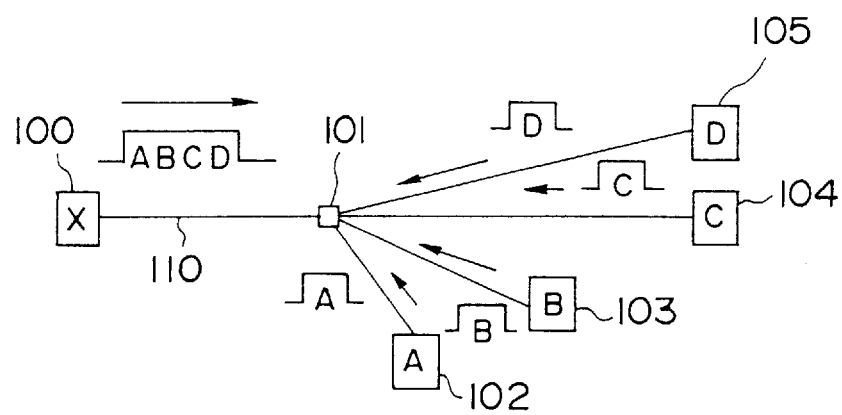
FIGS. 1A and 1B are diagrams showing the construction of a TCM telecommunication system.
Figure 1B:
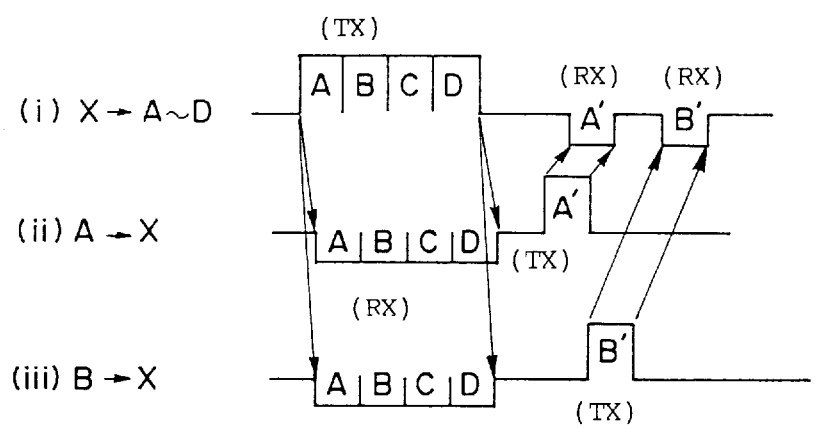
Figure 4:
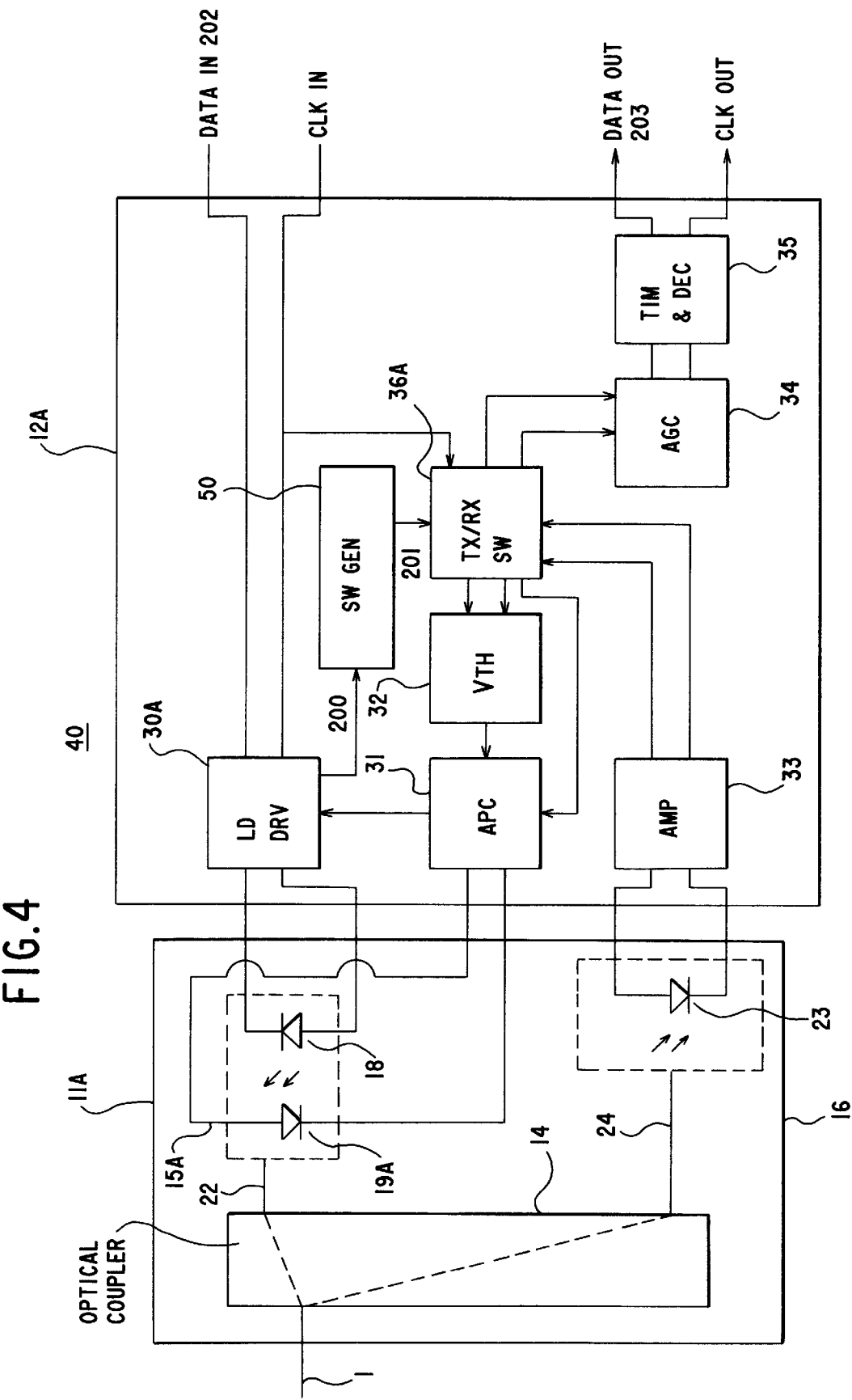
FIG. 4 is a circuit diagram of an optical telecommunication module according to an embodiment of the present invention.

FIG. 4 shows the circuit diagram of an optical telecommunication module 40 according to an embodiment of the present invention, wherein the optical telecommunication module 40 is used in a TCM optical telecommunication system as shown in FIGS. 1A and 1B. In FIG. 4, those parts described previously are designated by the same reference numerals and the description thereof will be omitted.

Referring to FIG. 4, the optical telecommunication module 40 includes an optical transceiver 11A for sending out an optical transmission signal on the optical transmission line 13 according to a transmission signal and for receiving an optical transmission signal incoming thereto from the optical transmission line 13, and a drive unit 12A for driving the optical transceiver 11A by the transmission signal. Further, the drive unit 12A reproduces a reception signal from the optical transmission signal received by the optical transceiver 11A. The optical transceiver 11A and the drive unit 12A are mounted upon a printed circuit board.

Figure 5:
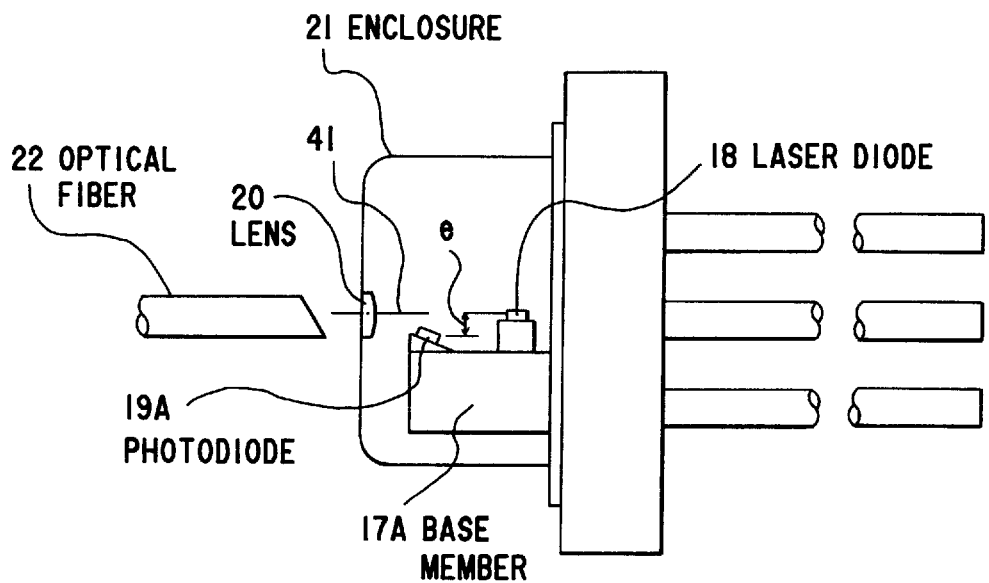
FIG. 5 is a diagram showing the construction of the optical telecommunication module of FIG. 4.

The optical transceiver 11A includes therein an optical transmission module 15A in addition to the optical coupler 14 and the reception module 16 described already, wherein the optical transmission module 15A includes a base member 17A on which the laser diode 18 and a photodiode 19A are carried as indicated in FIG. 5 such that the laser diode 18 is in alignment with an optical axis 41 of the lens 20.

Figure 6:
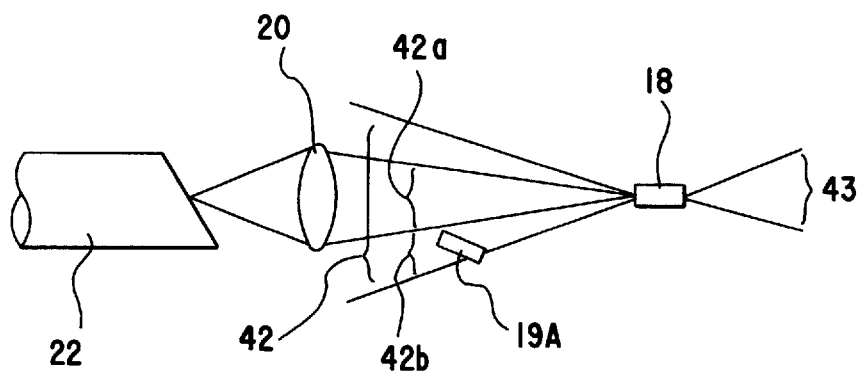
FIG. 6 is a diagram showing an optical path formed in the optical telecommunication module of FIG. 5.

In FIG. 5, it will be noted that the photodiode 19A is provided in front of the laser diode 18, between the laser diode 18 and the lens 20, with an offset from the optical axis 41 in a downward direction with an offset distance e and with a tilt toward the laser diode 18. Similarly as before, the laser diode 18 is coupled to the optical fiber 22 via the lens 20 and injects an optical beam cone 42a shown in FIG. 6 into a core of the optical fiber 22. Thereby, as indicated in FIG. 6, the photodiode 19A detects a marginal part 42b of the optical beam cone emitted from the laser diode 18 in the form of a divergent beam 42. It should be noted that the distance e is set such that the photodiode 19A does not interrupt the inner cone 42a of the optical beam 42 that is actually injected to the core of the optical fiber 22. In FIG. 5, it will be noted that the photodiode 19A emits an optical beam 43 in the backward direction, while the present invention does not use the optical beam 43 for the APC control.

Figure 2:
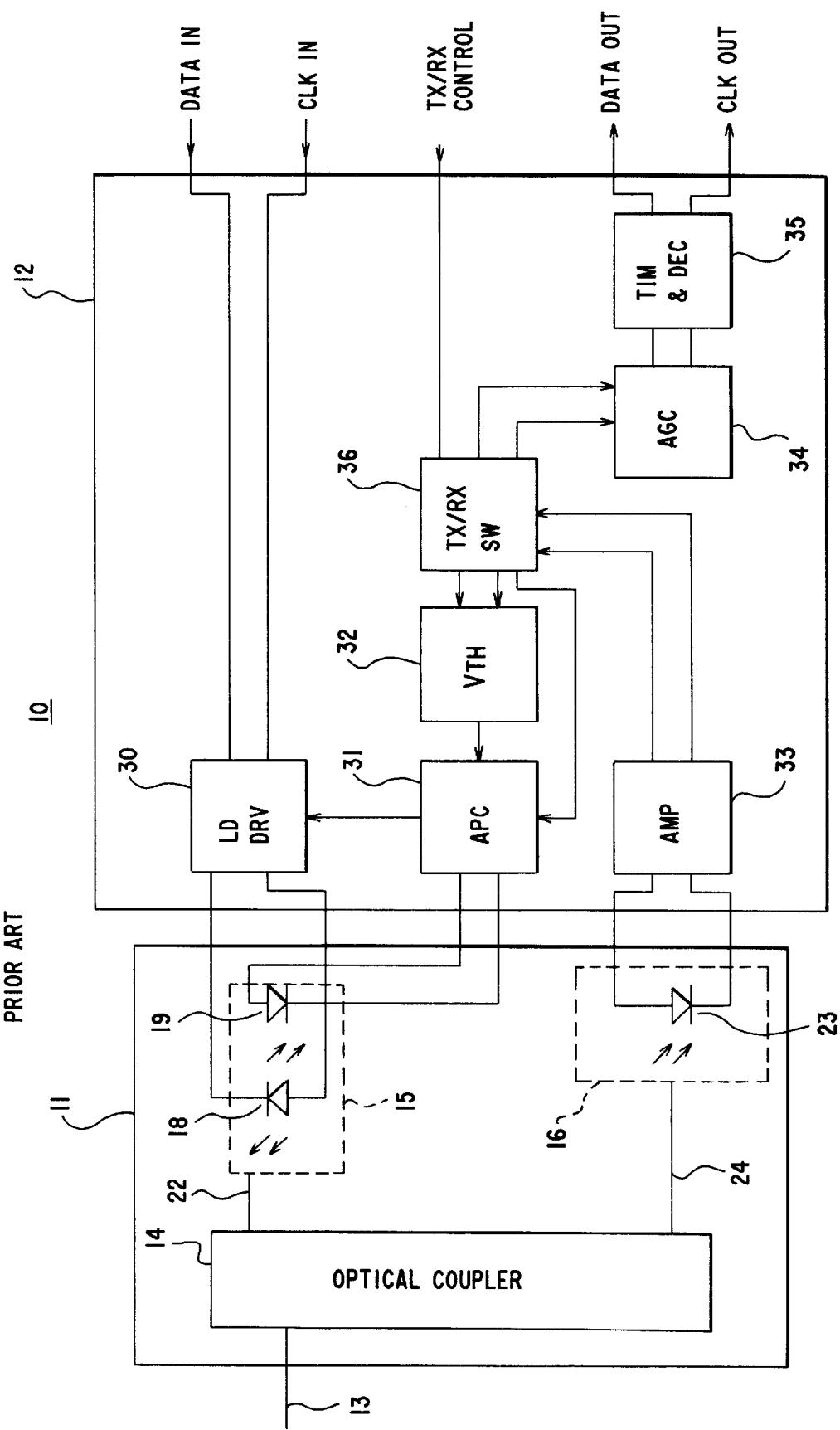
FIG. 2 is a circuit diagram showing a conventional optical telecommunication module.
Figure 3:
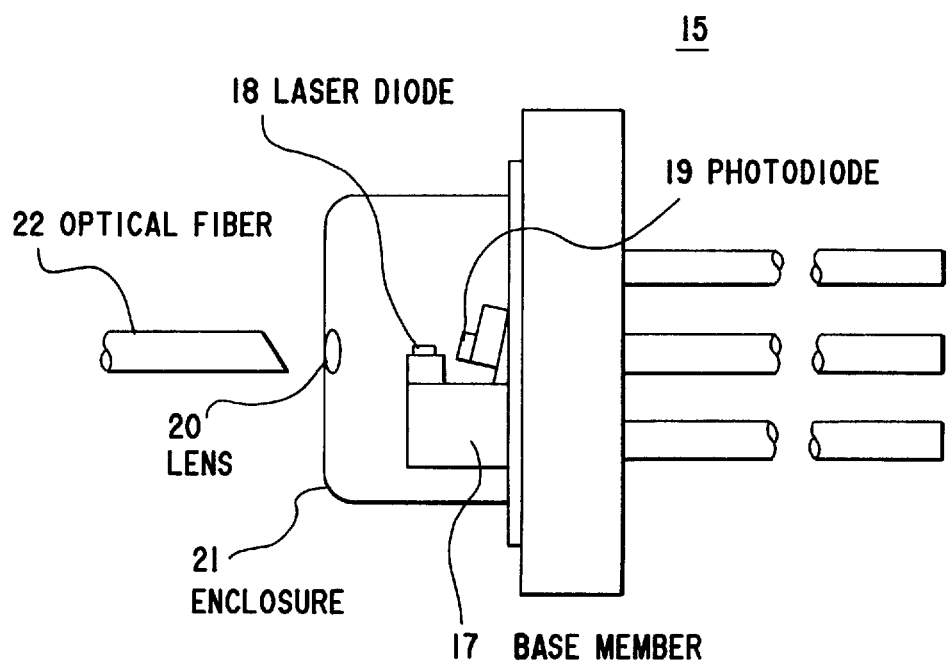
FIG. 3 is a diagram showing the construction of the optical telecommunication module of FIG. 2.

Referring to FIG. 4 again, it will be noted that the photodiode 19A is connected to the APC circuit 31 similarly to the photodiode 19 of FIG. 2 for controlling the laser diode 18 such that the optical output power of the laser diode 18 is maintained substantially constant. Thereby, the APC circuit 31 controls the laser diode 18 in response to the optical output thereof emitted in the forward direction and detected by the photodiode 19A, via a drive circuit 30A, by referring to the threshold circuit 32. It should be noted that the drive circuit 30A is supplied with data and clock as an input signal 202, similarly to the drive circuit 30 of FIG. 2.

Further, the drive circuit 30A produces a transmission status signal 200 when driving the laser diode 18 and supplies the same to a switching signal generator 50 forming a part of the drive unit 12A. The transmission status signal 200 may be the drive current itself that is supplied to the laser diode 18 or a signal corresponding to the drive current. The switching signal generator 50 in turn produces a switching signal 201 and supplies the same to a transmission/reception switch 36A, wherein the switch 36A activates the APC circuit 31 when the transmission status signal 201 indicates a transmission mode.

When the status signal 201 indicates a reception mode, on the other hand, the switch 36A activates the AGC circuit 34 and forwards thereto the output of the preamplifier 33. Thereby, the TIM/DEC processor 35 extracts clock timing from the received signal and the processor 35 further reproduces the data modulated on the reception signal based upon the clock timing thus extracted. The data thus reproduced is outputted from the processor 35 as an output signal 203.

In the telecommunication system that uses the optical transmission module 40 of FIG. 4 in the stations included in the system such as the one shown in FIGS. 1A and 1B, it should be noted that collision of transmission is successfully avoided by sending out the timing of transmission from the station X designated by the reference numeral 100, to each of the stations A–D designated respectively by the reference numerals 101–105.

As already noted, the transmission/reception switch 50 produces the switching signal 201 in response to the transmission status signal 200. FIGS. 7A and 7B show an example of such a transmission status signal 200 and the switching signal 201, wherein it will be noted that the switching signal 201 rises immediately in response to the leading edge of the transmission status signal and falls when the low level state of the transmission status signal 200 continues for a predetermined interval.

The switching signal 201 is supplied to the transmission/reception switch 36A together with the clock supplied to the drive circuit 30A as indicated in FIG. 4, wherein the transmission/reception switch 36A controls the activation of the APC circuit 31 and the AGC circuit 34 selectively in response to the switching signal 201. As a result, the transmission signal 202 and the reception signal 203 are switched in accordance with a time-divisional multiplex process as indicated in FIGS. 8A and 8B in response to the switching signal 201 shown in FIG. 8C.

The telecommunication module 40 has an advantageous feature that: (a) one can eliminate external transmission/reception control unit for switching the transmission mode and the reception mode; and (b) one can monitor the optical output of the laser diode directly by providing the photodiode 19 in front of the laser diode 18. Thereby, any anomaly in the emission of the optical beam is immediately detected with reliability.

In the present invention as described heretofore, it should be noted that one can use the photodiode 19A also for the photodiode 23 that detects the incoming optical signal. In such a construction, the photodiode 19A detects the incoming optical beam focused upon the optical surface of the laser diode 18 for capturing the optical beam reflected back therefrom.

Further, the present invention is not limited to the embodiments described heretofore, but various variations and modifications may be made without departing from the scope of the invention.

What is claimed is:

1. An optical telecommunication module comprising:
   an optical transceiver adapted for coupling to an optical transmission line for sending out an outgoing optical transmission signal therealong and for receiving an incoming optical transmission signal therefrom;
   said optical transceiver including:
      a base;
      a light emitting device mounted on the base and supplied with a transmission signal for emitting an optical signal in response thereto in a forward direction along a predetermined optical axis;
   an optical coupler adapted for coupling to the optical transmission line, the optical coupler being connected optically to the light emitting device for injecting the optical signal emitted from the light emitting device into the optical transmission line as the outgoing optical transmission signal, and a photodetection device connected optically to the optical coupler for receiving the incoming optical transmission signal from the optical transmission line, the photodetector producing a reception signal in response thereto, the photodetection device being mounted on the base at a position forward of the light emitting device, with an offset from the predetermined optical axis, the photodetection device being inclined toward the light emitting device for detecting a part of the optical beam emitted from the light emitting device;
   a drive unit for driving the optical transceiver, said drive unit including a drive circuit feeding the transmission signal to the light emitting device, an automatic power control circuit for controlling a drive current of the light emitting device such that the optical signal emitted from the light emitting device has a predetermined, constant optical power, an automatic gain control circuit for controlling a level of the reception signal at a predetermined level, and a transmission/reception switching circuit for selectively activating the automatic power control circuit and the automatic gain control circuit, such that the automatic power control circuit is activated in a transmission mode for transmitting the outgoing optical signal and that the automatic gain control circuit is activated in a reception mode for receiving the incoming optical signal;

said optical telecommunication module further including a monitoring photodetection device such that the monitoring photodetection device captures a part of the optical signal that is emitted from the light emitting device in the forward direction for injection into the optical transmission line, wherein the monitoring detection device and the photodetection device are a same photodetection device used for receiving the incoming optical transmission signal.

2. An optical module as claimed in claim 1, wherein said transmission/reception switching circuit is supplied, from the drive circuit, a status signal indicative of the transmission mode and the reception mode, for causing a selective activation of said automatic power control circuit and said automatic gain control circuit, by producing a switching control signal in response to said status signal.

3. An optical module as claimed in claim 2, wherein said status signal is a drive current supplied from said drive circuit to said light emitting device.

4. An optical module as claimed in claim 2, wherein said transmission/reception switching circuit produces said switching control signal such that said switching control signal rises in response to a leading edge of said status signal and falls in response to a trailing edge of said status signal with a predetermined delay.

5. An optical telecommunication module, comprising:

an optical transceiver adapted for coupling to an optical transmission line for sending out an outgoing optical transmission signal therealong and for receiving an incoming optical transmission signal therefrom;

said optical transceiver including:

a base;

a light emitting device mounted on the base and supplied with a transmission signal for emitting an optical signal in response thereto in a forward direction along a predetermined optical axis;

an optical coupler adapted for coupling to the optical transmission line, the optical coupler being connected optically to the light emitting device for injecting the optical signal emitted from the light emitting device into the optical transmission line as the outgoing optical transmission signal, and a photodetection device connected optically to the optical coupler for receiving the incoming optical transmission signal from the optical transmission line, the photodetector producing a reception signal in response thereto, the photodetection device being mounted on the base at a position forward of the light emitting device, with an offset from the predetermined optical axis, the photodetection device being inclined toward the light emitting device for detecting a part of the optical beam emitted from the light emitting device;

a drive unit for driving the optical transceiver, said drive unit including a drive circuit feeding the transmission signal to the light emitting device, an automatic power control circuit for controlling a drive current of the light emitting device such that the optical signal emitted from the light emitted device has a predetermined, constant optical power, an automatic gain control circuit for controlling a level of the reception signal at a predetermined level, and a transmission/reception switching circuit for selectively activating the automatic power control circuit and the automatic gain control circuit, such that the automatic power control circuit is activated in a transmission mode for transmitting the outgoing optical signal and that the automatic gain control circuit is activated in a reception mode for receiving the incoming optical signal;

wherein the optical telecommunication module is connected to the photodetection device and controls the photodetection device to capture a part of the optical signal emitted from said light emitting device in the forward direction for injection into the optical transmission line, wherein the monitoring photodetection device and the photodetection device are a same photodetection device used for receiving the incoming optical transmission signal.

* * * * *